United States Patent
Kim et al.

(10) Patent No.: US 6,525,794 B1
(45) Date of Patent: Feb. 25, 2003

(54) MULTI-DOMAIN LIQUID CRYSTAL DISPLAY DEVICE HAVING A DIELECTRIC FRAME CONTROLLING ALIGNMENT OF THE LIQUID CRYSTAL MOLECULES

(75) Inventors: Kyeong Jin Kim, Bucheon-shi (KR); Do Hee Kwon, Koyang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/421,114

(22) Filed: Oct. 19, 1999

(30) Foreign Application Priority Data

Oct. 19, 1998 (KR) .......................................... 1998-43631
Oct. 20, 1998 (KR) .......................................... 1998-43920

(51) Int. Cl.⁷ ...................... G02F 1/1337; G02F 1/1343
(52) U.S. Cl. ..................... 349/129; 349/160; 349/191
(58) Field of Search .................... 349/129, 160, 349/191

(56) References Cited

U.S. PATENT DOCUMENTS

| | | | |
|---|---|---|---|
| 4,581,608 A | 4/1986 | Aftergut et al. | |
| 4,728,175 A | 3/1988 | Baron ......................... | 350/336 |
| 4,937,566 A | 6/1990 | Clerc | |
| 4,978,203 A | 12/1990 | Yamazaki et al. | |
| 5,249,070 A | 9/1993 | Takano | |
| 5,309,264 A | 5/1994 | Lien et al. | |
| 5,574,582 A | 11/1996 | Takeda et al. ................. | 359/59 |
| 5,579,141 A | 11/1996 | Suzuki et al. | |
| 5,610,743 A * | 3/1997 | Tsai ............................ | 349/124 |
| 5,623,354 A | 4/1997 | Lien et al. | |
| 5,627,667 A | 5/1997 | Mizushima et al. | |
| 5,644,372 A * | 7/1997 | Shinjo et al. ................. | 349/139 |
| 5,657,102 A | 8/1997 | Mizushima et al. | |
| 5,666,178 A | 9/1997 | Hirata et al. | |
| 5,668,650 A | 9/1997 | Mori et al. .................... | 349/42 |
| 5,673,092 A * | 9/1997 | Horie et al. ................... | 349/86 |
| 5,691,792 A | 11/1997 | Mizushima et al. | |
| 5,737,051 A | 4/1998 | Kondo et al. ................. | 349/141 |

(List continued on next page.)

FOREIGN PATENT DOCUMENTS

| | | |
|---|---|---|
| EP | 0 613 037 | 8/1994 |
| EP | 0 635 748 | 1/1995 |

(List continued on next page.)

OTHER PUBLICATIONS

A. Lien, et al., *Two–Domain TN–LCDs Fabricated by Parallel Fringe Field Method*, SID 93 Digest, pp. 269–272.
A. Lien, et al., *TFT–Addressed Two–Domain TN VGA Displays Fabricated Using the Parallel–Fringe–Field Method*, SID 94 Digest, pp. 594–597.

(List continued on next page.)

*Primary Examiner*—Toan Ton
*Assistant Examiner*—Andrew Schechter
(74) *Attorney, Agent, or Firm*—McKenna Long & Aldridge LLP

(57) ABSTRACT

A multi-domain liquid crystal display device comprises first and second substrates facing each other and a liquid crystal layer between the first and second substrates. A plurality of gate bus lines are arranged in a first direction on the first substrate and a plurality of data bus lines are arranged in a second direction on the first substrate to define a pixel region. A pixel electrode is formed in the pixel region, a color filter layer is formed on the second substrate, and a common electrode is formed on the color filter layer. Dielectric frames control alignment direction of the liquid crystal molecules in the liquid crystal layer, and an alignment layer is formed on at least one substrate between the first and second substrates.

30 Claims, 16 Drawing Sheets

U.S. PATENT DOCUMENTS

| | | | | |
|---|---|---|---|---|
| 5,739,883 A | * | 4/1998 | Chen et al. | 349/124 |
| 5,777,701 A | | 7/1998 | Zhang | 349/44 |
| 5,831,704 A | * | 11/1998 | Yamada et al. | 349/124 |
| 5,907,380 A | * | 5/1999 | Lien | 349/141 |
| 6,013,335 A | | 1/2000 | Hirata et al. | |
| 6,014,188 A | * | 1/2000 | Yamada et al. | 349/32 |
| 6,040,885 A | | 3/2000 | Koike et al. | |
| 6,052,161 A | * | 4/2000 | Yamada et al. | 349/32 |
| 6,104,450 A | * | 8/2000 | Hiraishi | 349/48 |
| 6,140,988 A | * | 10/2000 | Yamada | 345/88 |

FOREIGN PATENT DOCUMENTS

| | | |
|---|---|---|
| EP | 0 636 919 | 2/1995 |
| EP | 0 752 611 A2 | 1/1997 |
| EP | 0 814 142 | 12/1997 |
| EP | 0 854 377 A2 | 7/1998 |
| EP | 0 884 626 | 12/1998 |
| EP | 0 977 078 | 2/2000 |
| GB | 2 296 810 | 7/1996 |
| GB | 2 321 718 | 8/1998 |
| GB | 2 337 843 | 1/1999 |
| JP | 05-297412 | 11/1993 |
| JP | 07-14701 | 1/1995 |
| JP | 9-197420 | 7/1997 |
| JP | 09-230387 | 9/1997 |
| KR | 1994-0004297 | 5/1994 |
| KR | 1994-22141 | 10/1994 |
| KR | 10-0254283 | 2/2000 |
| WO | 961 0774 | 4/1996 |
| WO | WO 96/10774 | 4/1996 |

OTHER PUBLICATIONS

N. Koma, et al., *No–Rub Multi–Domain TFT–LCD Using Surrounding–Electrode Method*, SID 95 Digest, pp. 869–872.

H. Murai, et al., *Novel high contrast random and controlled 4–domain CTN–LCDs with wide viewing angle*, Euro Display '96, pp. 159–161.

Y. Koike, et al., *A Vertically Aligned LCD Providing Super–High Image Quality*, IDW '97, pp. 159–162.

N. Koma, et al., *Development of a High–Quality TFT–LCD for Projection Displays*, SID 97 Digest, pp. 461–464.

K. Ohmuro, et al., *Development of Super–High–Image–Quality Vertical–Alignment–Mode LCD*, SID 97 Digest, pp. 845–848.

A. Lien, R.A. John, Two–Domain TN–LCDs Fabricated by Parallel Fringe Field Method, SID Digest, 1993, pp. 269–272.

A. Lien, R.A. John, TFT–Addressed Two–Domain TN VGA Displays Fabricated Using the Parallel Fringe Field Method, SID Digest, 1994, pp. 594–597.

N. Koma, Y. Baba, K. Matsuoka, No–Rub Multi–Domain TFT–LCD Using Surrounding–Electrode Method, SID Digest, 1995, pp. 869–872.

H. Murai, M. Suzuki, S. Kaneko, Novel High Contrast Random and Controlled 4–Domain CTN–LCDs with Wide Viewing Angle, Euro Display '96, pp. 159–161.

Y. Koike, S. Kataoka, T. Sasaki, H. Chida, H. Tsuda, A. Takeda and K. Ohmuro, T. Sasabayashi, K. Okamoto, A Vertically Aligned LCD Providing Super–High Image Quality, IDW '97, pp. 159–162.

N. Koma, R. Nishikawa, Development of a High–Quality TFT–LCD for Projection Displays, SID Digest, 1997, pp. 461–464.

K. Ohmuro, S. Kataoka, T. Sasaki, Y. Koike, Development of Super–High Image Quality Vertical Alignment Mode LCD, SID Digest, 1997, pp. 845–848.

* cited by examiner

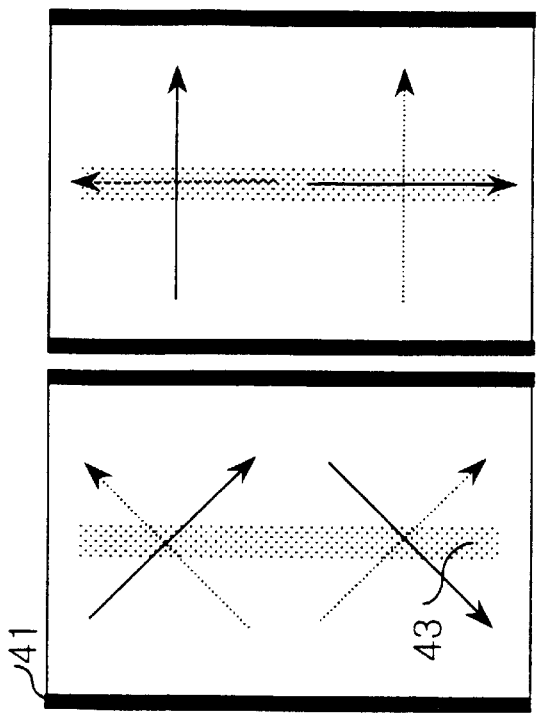
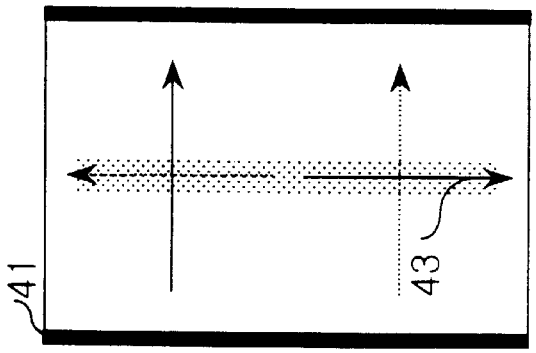
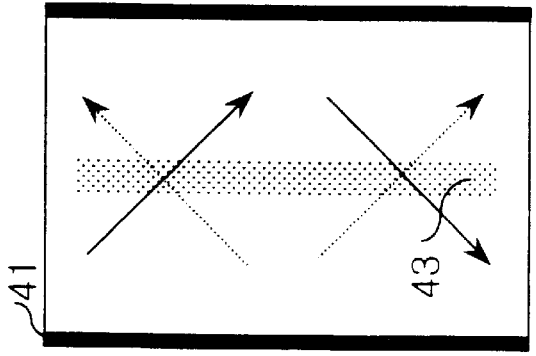
FIG. 9C
FIG. 9B
FIG. 9A

MULTI-DOMAIN LIQUID CRYSTAL DISPLAY DEVICE HAVING A DIELECTRIC FRAME CONTROLLING ALIGNMENT OF THE LIQUID CRYSTAL MOLECULES

BACKGROUND OF THE INVENTION

1. Field of the Invention

The present invention relates to a liquid crystal display device (LCD), and more particularly, to a liquid crystal display device having dielectric frames on one substrate and electric field inducing window on the other substrate.

2. Description of the Related Art

Recently, a LCD has been proposed where the liquid crystal is not aligned, and the liquid crystal is driven by common electrode 17 having open areas 19. FIG. 1 is sectional view of pixel unit of the conventional LCD.

Regarding conventional LCDs, a plurality of gate bus lines arranged in a first direction on a first substrate and a plurality of data bus lines arranged in a second direction on the first substrate divide the first substrate into a plurality of pixel regions.

A thin film transistor (TFT) applies image signal delivered from the data bus line to a pixel electrode 13 on a passivation layer 4. The TFT is formed on each pixel region and comprises a gate electrode, a gate insulator, a semiconductor layer, an ohmic contact layer, a source electrode, and a drain electrode, etc.

Alternatively, a side electrode 15 is formed to surround the pixel region on the gate insulator, a passivation layer 4 is formed over the whole first substrate, and pixel electrode 13 is formed to overlap the side electrode 15 and is connected to the drain electrode thereon.

On a second substrate, a light shielding layer is formed to shield any light leakage from gate and data bus lines, and the TFT, a color filter layer is formed on the light shielding layer, an overcoat layer is formed on the color filter layer, a common electrode 17 is formed to have open area 19 on the overcoat layer, and a liquid crystal layer is formed between the first and second substrates.

Pixel electrode 13 and open area (slit) 19 in the common electrode 17 distort the electric field applied to the liquid crystal layer. Then, liquid crystal molecules are driven variously in a unit pixel. This means that when voltage is applied to the LCD, dielectric energy due to the distorted electric field arranges the liquid crystal directors in needed or desired positions.

FIG. 2 is a sectional view of the other liquid crystal display device in the related art. The liquid crystal display device has a smaller pixel electrode 13 than common electrode 17, which induces the distortion of electric field.

In the LCDs, however, open area 19 in common electrode 17 or pixel electrode 13 is necessary, and the liquid crystal molecules could be driven stably when the open area is wider. If the electrodes do not have an open area or the width of the open area is narrow, the electric field distortion needed to divide the pixel region becomes weak. And, disclination occurs from the area where the liquid crystal directors are parallel with a transmittance axis of the polarizer, which results in a decrease in brightness. Further, according to the surface state of LCDs, the liquid crystal texture has an irregular structure.

SUMMARY OF THE INVENTION

Accordingly, the present invention is directed to an LCD that substantially obviates one or more problems due to limitations and disadvantages of the related art.

An object of the present invention is to provide a multi-domain LCD having wide viewing angle by multi-domain and high brightness by stable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other, a liquid crystal layer between the first and second substrates, a plurality of gate bus lines arranged in a first direction on the first substrate and a plurality of data bus lines arranged in a second direction on the first substrate to define a pixel region, a pixel electrode in the pixel region, a dielectric frame controlling alignment direction of liquid crystal molecules in the liquid crystal layer, a color filter layer on the second substrate, a common electrode on the color filter layer, and an alignment layer on at least one substrate between the first and second substrates.

The common electrode and/or pixel electrode has an electric field inducing window in the inner part thereof.

The dielectric frame is formed surrounding the pixel region or in the pixel region. And, the dielectric constant of the dielectric frame is equal to or lower than dielectric constant of the liquid crystal layer. The dielectric frame includes photosensitive materials, such as photoacrylate and BCB (BenzoCycloButene).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings:

FIGS. 9A, 9B, and 9C are plan views of the multi-domain liquid crystal display devices according to embodiments of the present invention;

DETAILED DESCRIPTION OF THE PREFERRED EMBODIMENTS

Embodiments and other aspects of the invention described herein, including the system embodiments described below, may be made or used in conjunction with inventions described, in whole or in part, in commonly-owned co-pending U.S. patent application Ser. No. 09/256,180 filed in the names of inventors Seong Moh SEO, et al., entitled "Multi-Domain Liquid Crystal Display Device," and in commonly-owned co-pending U.S. patent application Ser. No. 09/326,415 filed in the names of inventors Kyeong Jin KIM, et al., entitled "Multi-Domain Liquid Crystal Display Device" which are each hereby incorporated by reference for all purposes as if fully set forth herein.

Hereinafter, the multi-domain liquid crystal display device of the present invention is explained in detail by accompanying the drawings.

Figure 1:
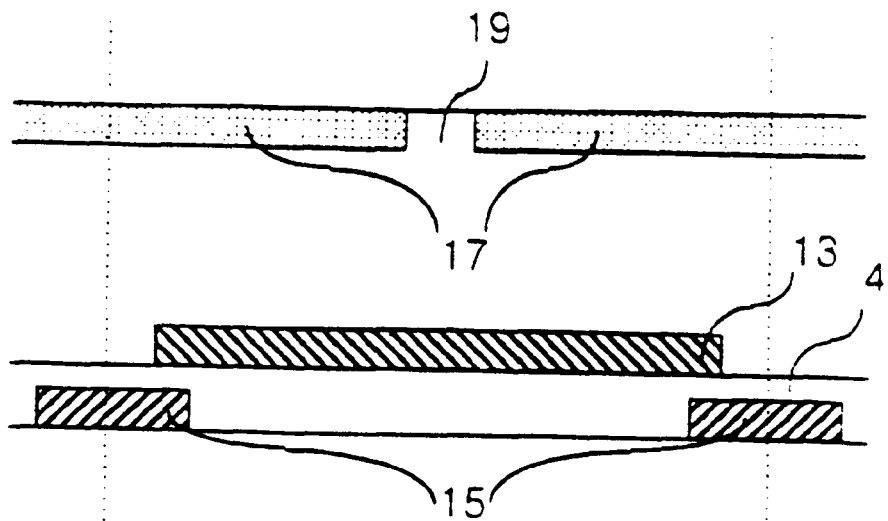
FIGS. 1 and 2 are sectional views of the liquid crystal display devices in the related art.
Figure 2:
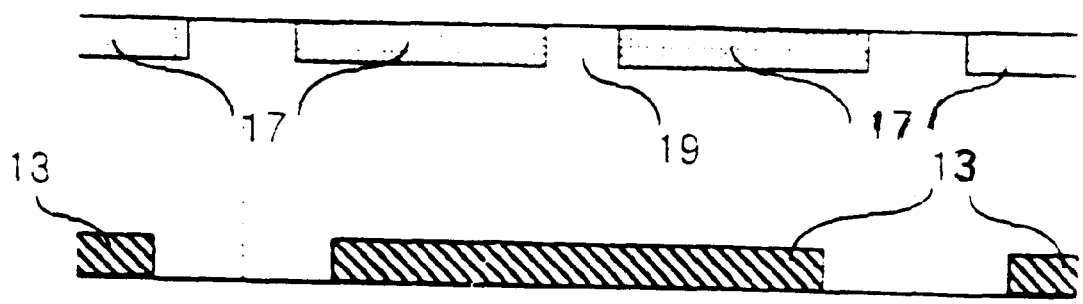
Figure 3A:
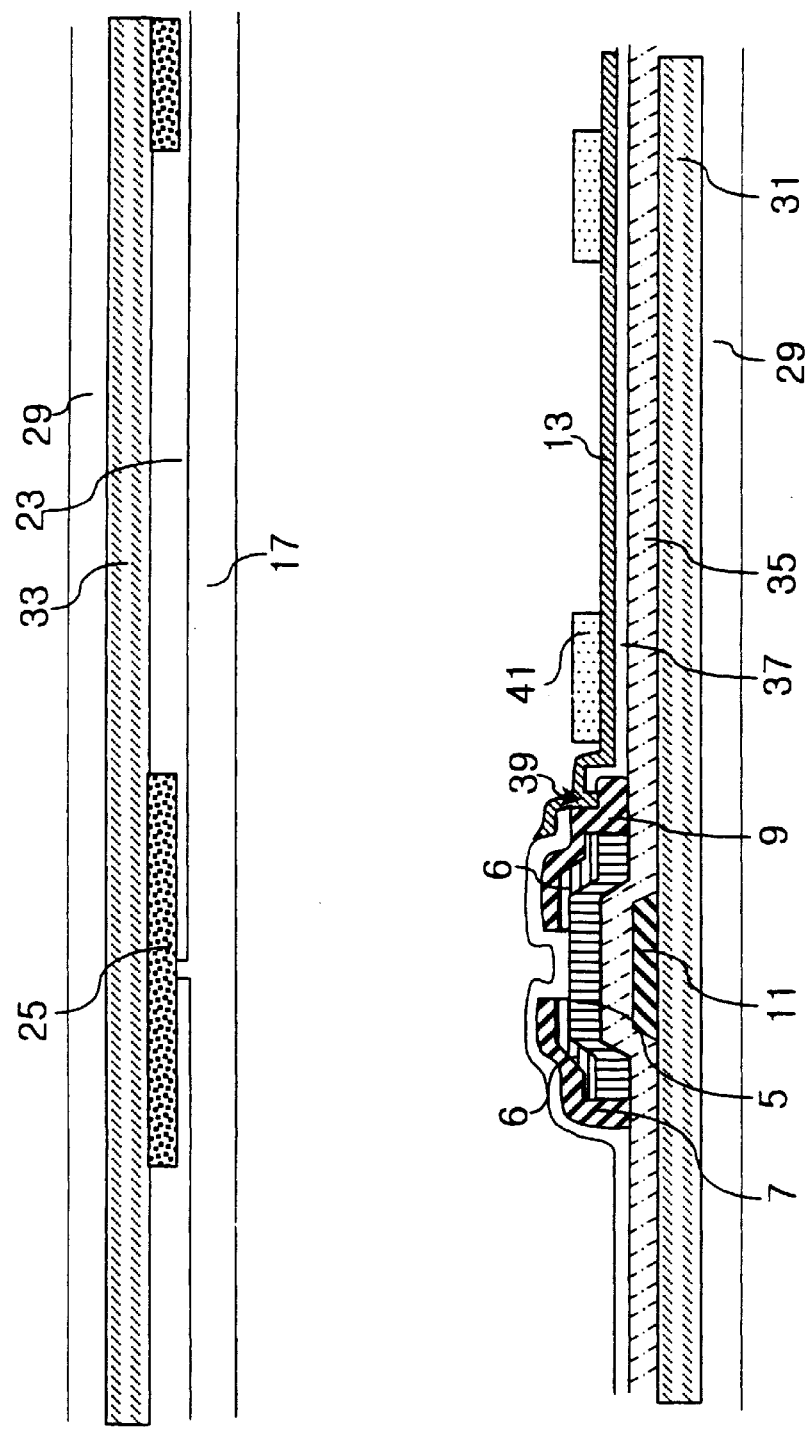
FIGS. 3A, 3B, 3C, and 3D are sectional views of the multi-domain liquid crystal display devices according to the first, second, third, and fourth embodiment of the present invention.
Figure 3B:
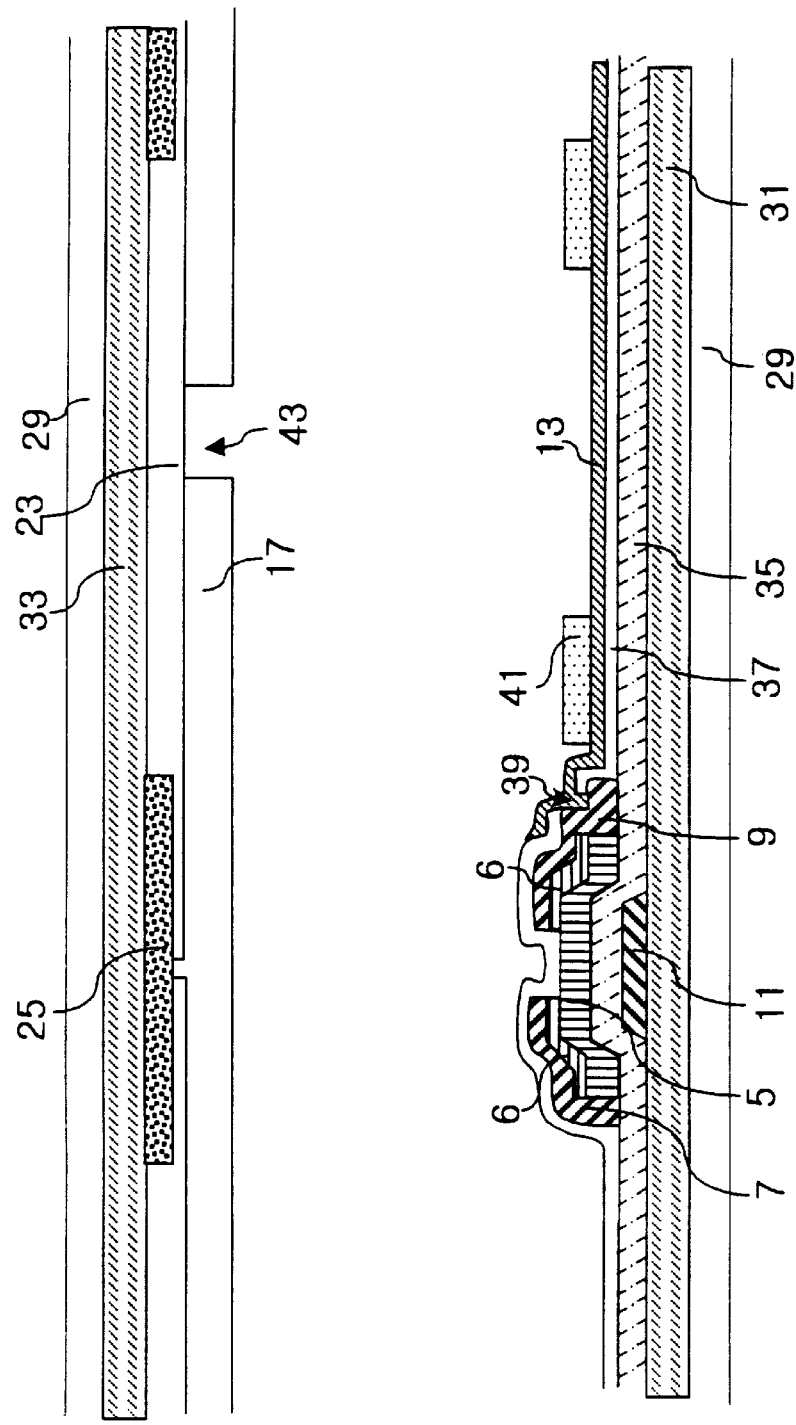
Figure 3C:
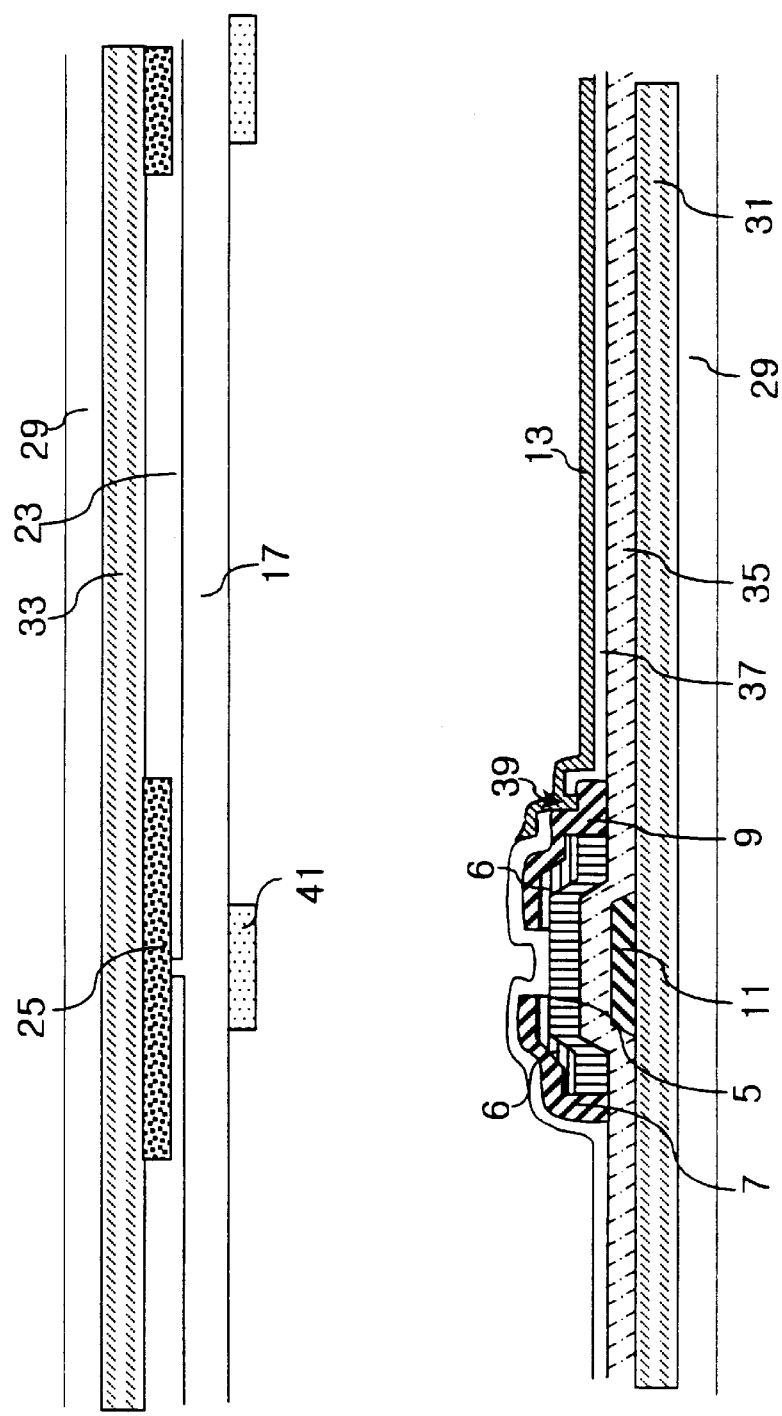
Figure 3D:
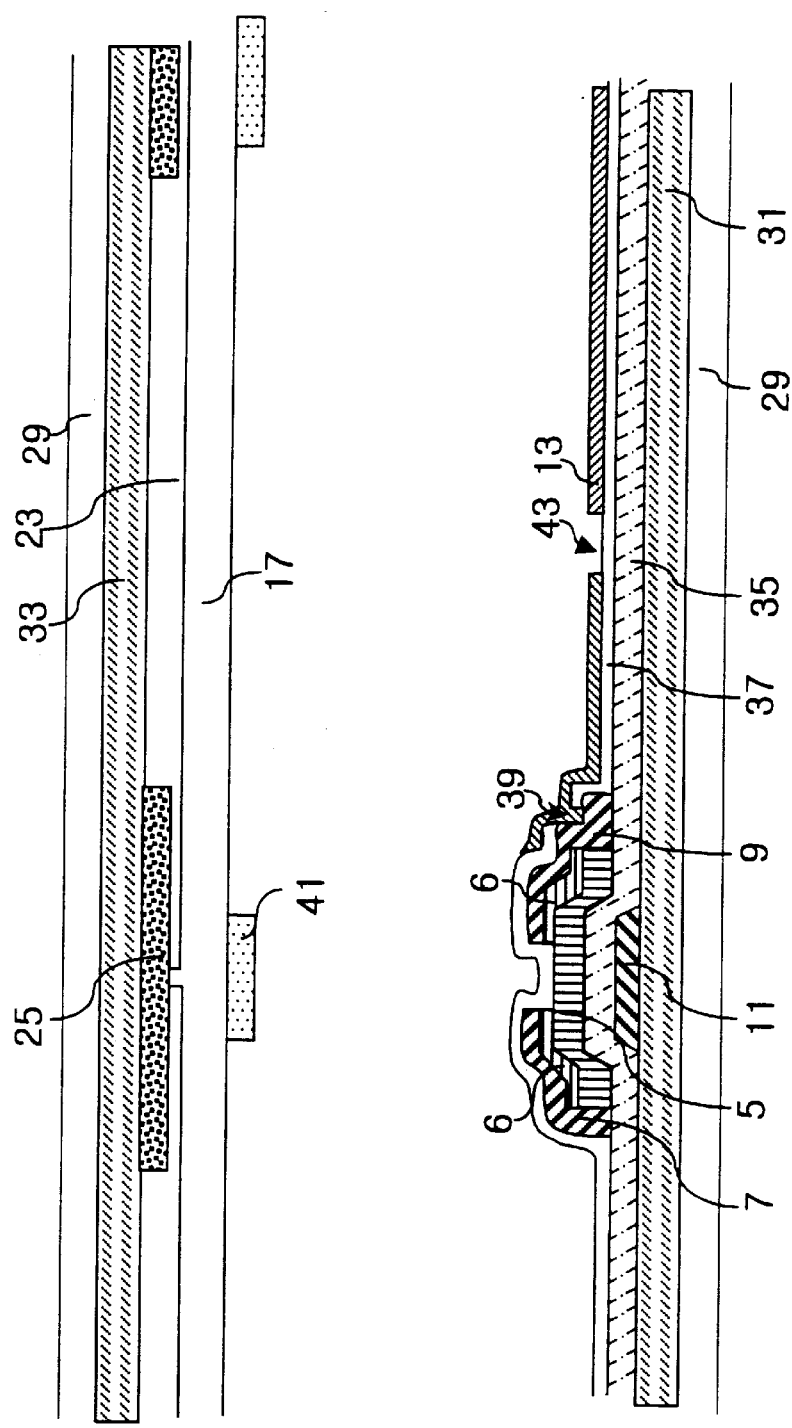

FIGS. 3A, 3B, 3C, and 3D are sectional views of the multi-domain liquid crystal display devices according to the first, second, third, and fourth embodiment of the present invention.

As shown in the figures, the present invention comprises first and second substrates 31, 33, a plurality of gate bus lines arranged in a first direction on the first substrate and a plurality of data bus lines arranged in a second direction on the first substrate, a TFT, a passivation layer 37 on the whole first substrate 31, a pixel electrode 13, dielectric frames 41, and a first alignment layer 45 on the whole first substrate 31.

On the second substrate 33, a light shielding layer 25 is formed to shield any light leakage from gate and data bus lines, and the TFT, a color filter layer 23 is formed on the light shielding layer, an overcoat layer 29 is formed on the color filter layer 23, a common electrode 17 is formed on the overcoat layer, a second alignment layer 47 on the whole second substrate 33, and a liquid crystal layer is formed between the first and second substrates 31, 33.

The data bus lines and gate bus lines divide the first substrate 31 into a plurality of pixel regions. The TFT is formed on each pixel region and comprises a gate electrode 11, a gate insulator 35, a semiconductor layer 5, an ohmic contact layer, and source/drain electrodes 7, 9. Passivation layer 37 is formed on the whole first substrate 31, and pixel electrode 13 is coupled to drain electrode 9.

The dielectric frame 41 is controlling alignment direction of liquid crystal molecules of the liquid crystal layer. This is formed on the pixel electrode 13 or the common electrode 17, and it is possible to form the dielectric frame on both substrates.

To manufacture the multi-domain LCD of the present invention, in each pixel region on the first substrate 31, a TFT is formed comprising gate electrode 11, gate insulator 35, semiconductor layer 5, ohmic contact layer 6 and source/drain electrodes 7, 9. At this time, a plurality of gate bus lines and a plurality of data bus lines are formed to divide the first substrate 31 into a plurality of pixel regions.

Gate electrode 11 and gate bus line are formed by sputtering and patterning a metal such as Al, Mo, Cr, Ta, Al alloy, etc. Alternatively, it is possible to form the gate electrode and gate bus line as a double layer, the double layer is formed from different materials.

The gate insulator 35 is formed by depositing $SiN_x$ or $SiO_x$ using PECVD (Plasma Enhancement Chemical Vapor Deposition) thereon. Semiconductor layer 5 and the ohmic contact layer are formed by depositing with PECVD and patterning amorphous silicon (a-Si) and doped amorphous silicon (n a-Si), respectively. Also, the gate insulator 35, the semiconductor layer 5, and the ohmic contact layer 6 are formed by PECVD and patterned. Data bus line and source/drain electrodes 7, 9 are formed by sputtering and patterning a metal such as Al, Mo, Cr, Ta, Al alloy, etc. Alternatively, it is possible to form the data bus line and source/drain electrodes as a double layer, the double layer is formed from different materials.

A storage electrode (not shown in the figures) is formed to overlap gate bus line and to connect to the pixel electrode 13 at the same time, the storage electrode makes a storage capacitor with the gate bus line 1.

Subsequently, passivation layer 37 is formed with BCB (BenzoCycloButene), acrylic resin, polyamide based material, $SiN_x$ or $SiO_x$ on the whole first substrate 31. Pixel electrode 13 is formed by sputtering and patterning a metal such as ITO(indium tin oxide), Al or Cr. A contact hole 39 is formed to connect the pixel electrode 13 to the drain and storage electrodes by opening and patterning a part of the passivation layer 37 on drain electrode 9. On the second substrate 33, a light shielding layer 25 is formed to shield any light leakage from gate and data bus lines, and the TFT. A color filter layer 23 is formed R, G, B (red, green, blue) elements to alternate on the light shielding layer 25. On the color filter layer 23, overcoat layer 29 is formed with resin. A common electrode 17 is formed with ITO on the overcoat layer.

And, a liquid crystal layer is formed by injecting liquid crystal between the first and second substrates 31, 33. The liquid crystal layer may include liquid crystal molecules having positive or negative dielectric anisotropy. Also, the liquid crystal layer may include chiral dopants.

A dielectric frame 41 is formed by depositing photosensitive material on the common electrode 17 or pixel electrode 13 and patterning in various shapes using photolithography. The dielectric frame 41 includes material of which dielectric constant is same or smaller than that of the liquid crystal, and the dielectric constant thereof is preferably below 3, for example, photoacrylate or BCB (BenzoCycloButene).

Furthermore, the dielectric frame 41 is formed on at least one substrate between the first and second substrates 31, 33 (refer to FIGS. 3A, 3B and 3C, 3D). And, an electric field inducing window 43 is formed on at least one substrate between the first and second substrates 31, 33 (refer to FIGS. 3B and 3D).

At this time, the dielectric frame 41 and electric field inducing window 43 are formed on same substrate together. The electric field inducing window 43 is formed by patterning hole or slit in the common electrode 17 or pixel electrode 13.

Figure 4C:
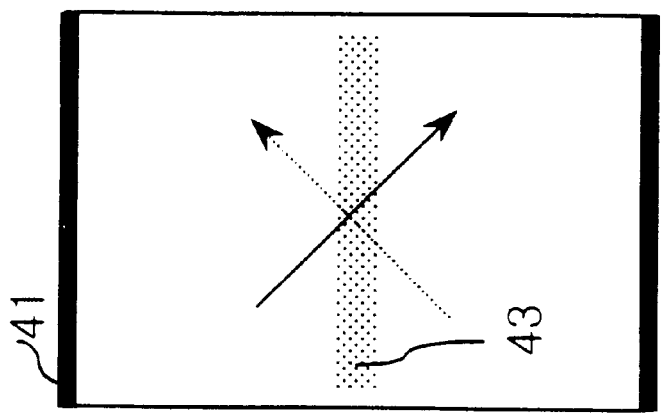
FIGS. 4A, 4B, and 4C are plan views of the multi-domain liquid crystal display devices according to embodiments of the present invention.
Figure 4B:
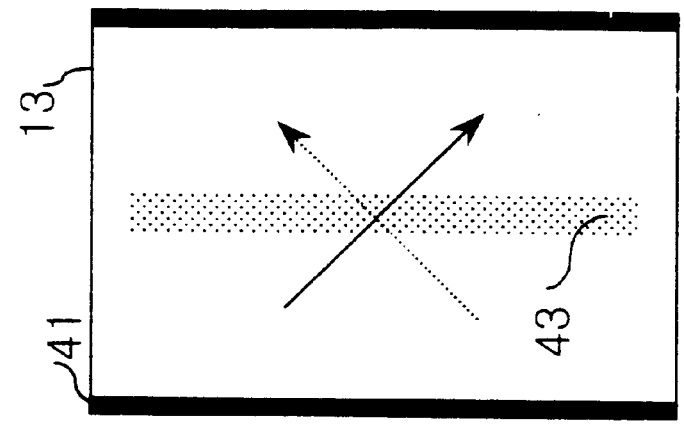
Figure 4A:
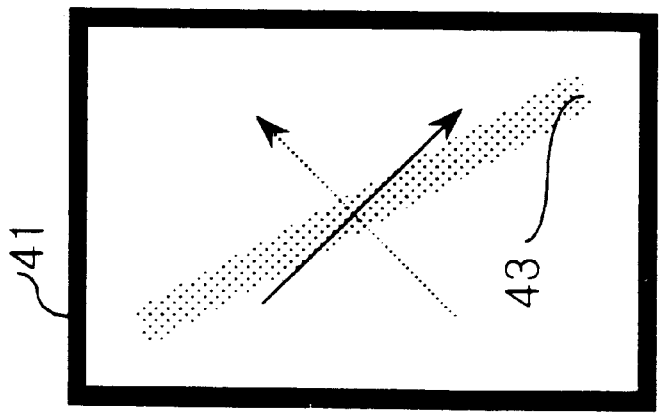
Figure 5A:
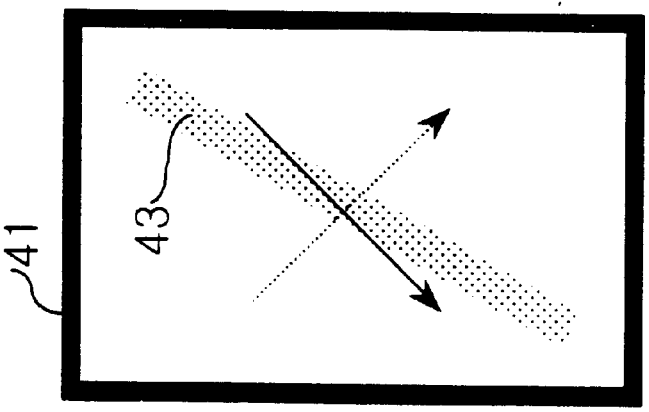
FIGS. 5A, 5B, and 5C are plan views of the multi-domain liquid crystal display devices according to embodiments of the present invention.
Figure 5B:
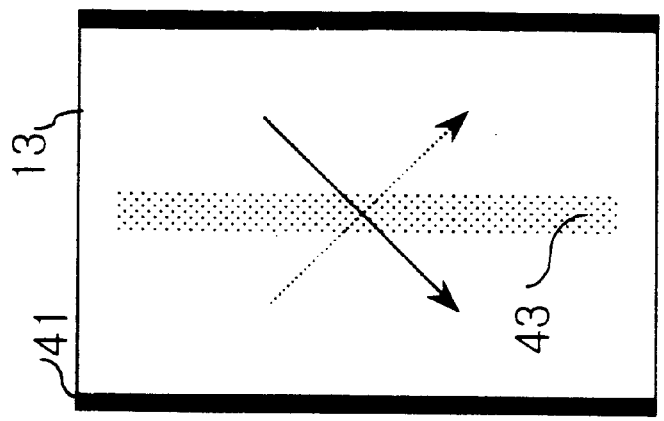
Figure 5C:
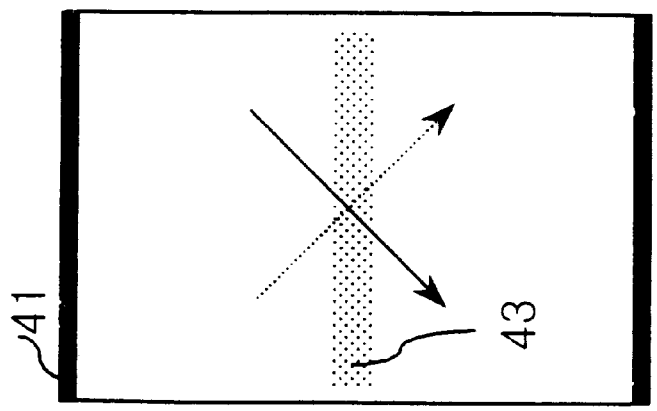
Figure 6C:
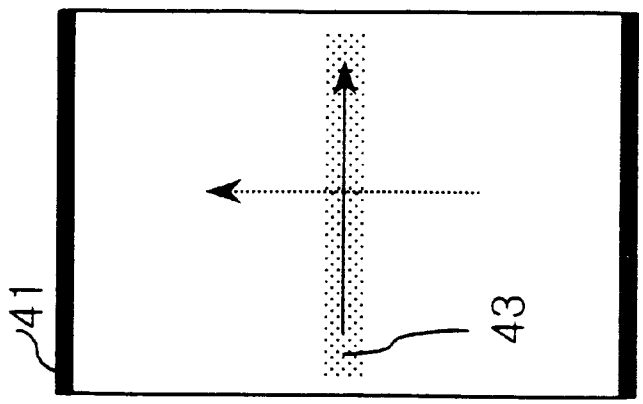
FIGS. 6A, 6B, and 6C are plan views of the multi-domain liquid crystal display devices according to embodiments of the present invention.
Figure 6B:
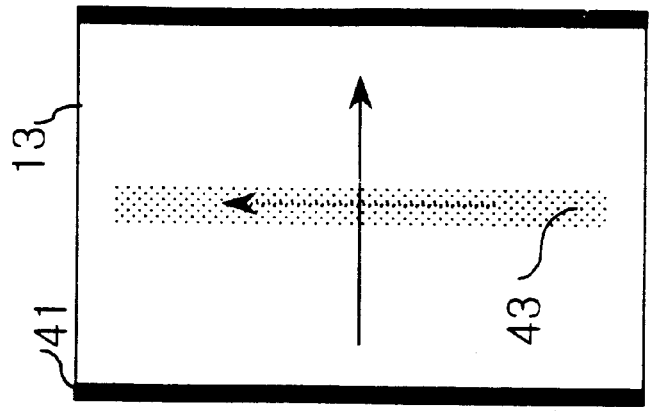
Figure 6A:
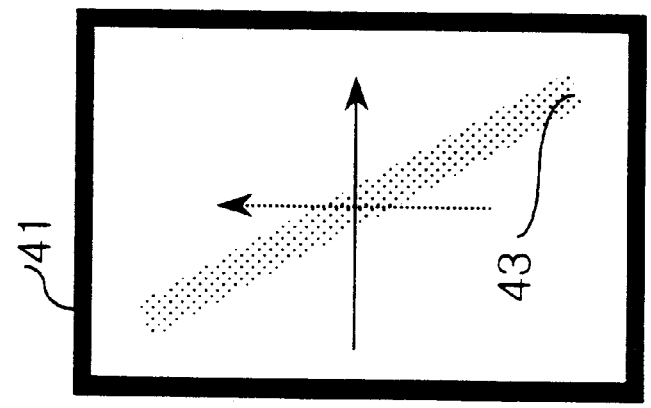
Figure 7C:
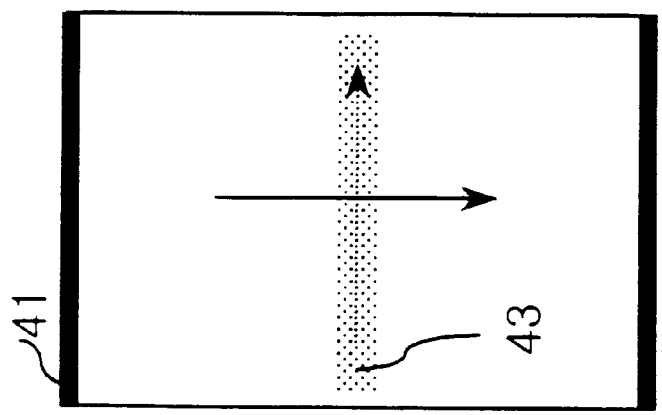
FIGS. 7A, 7B, and 7C are plan views of the multi-domain liquid crystal display devices according to embodiments of the present invention.
Figure 7B:
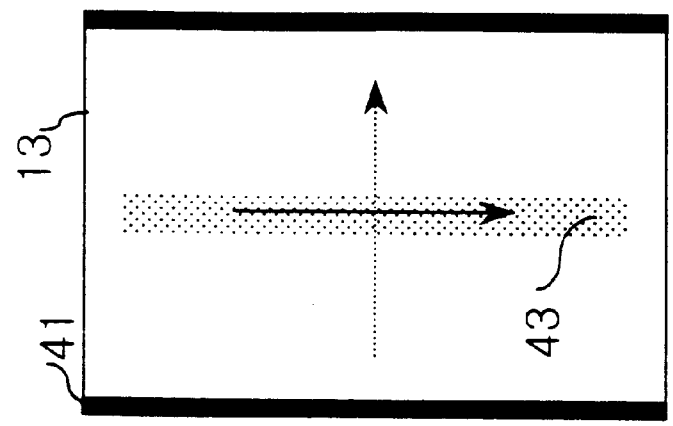
Figure 7A:
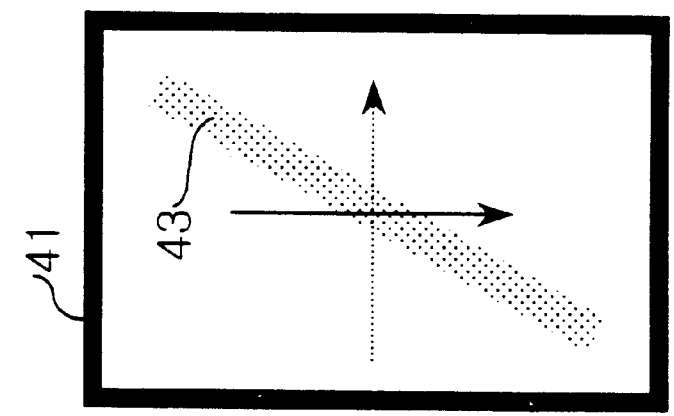
Figure 8C:
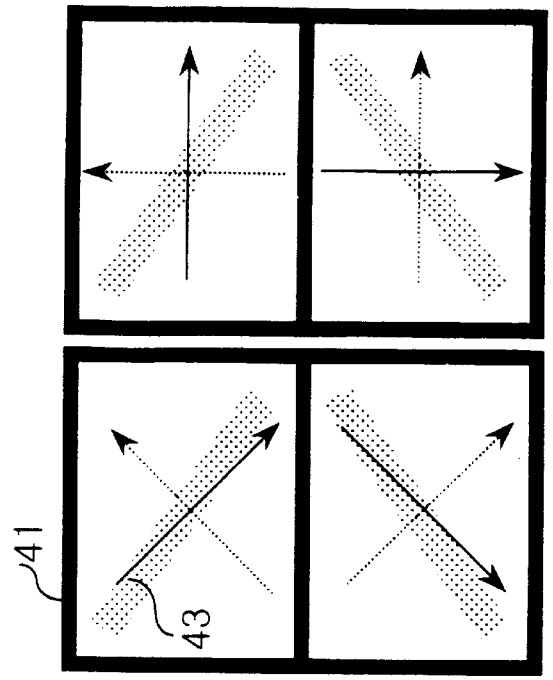
FIGS. 8A, 8B, and 8C are plan views of the multi-domain liquid crystal display devices according to embodiments of the present invention.
Figure 8B:
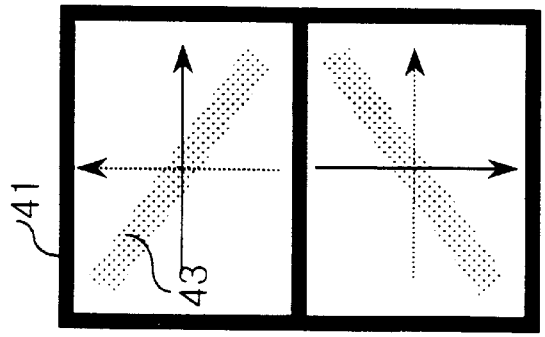
Figure 8A:
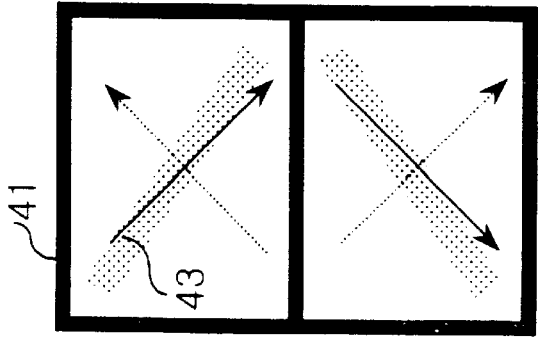
Figure 10C:
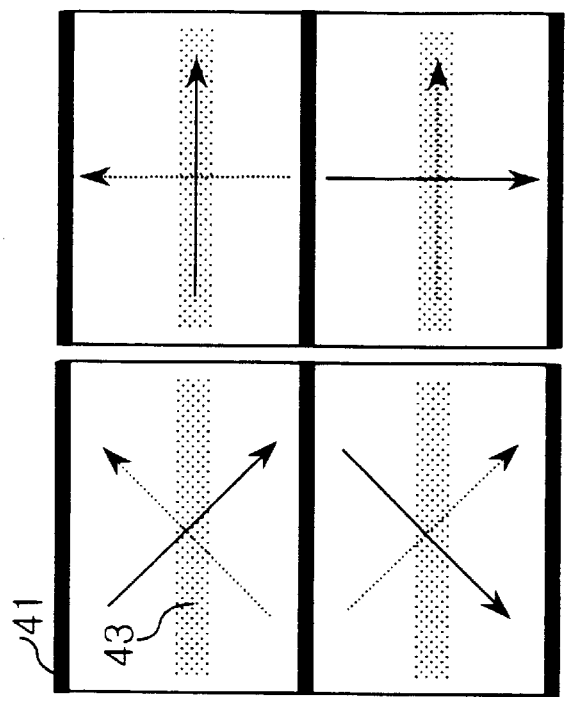
FIGS. 10A, 10B, and 10C are plan views of the multi-domain liquid crystal display devices according to embodiments of the present invention.
Figure 10B:
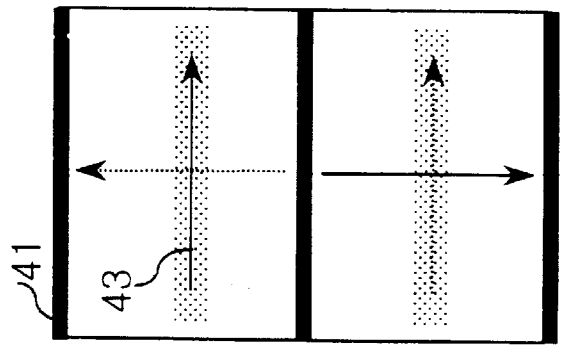
Figure 10A:
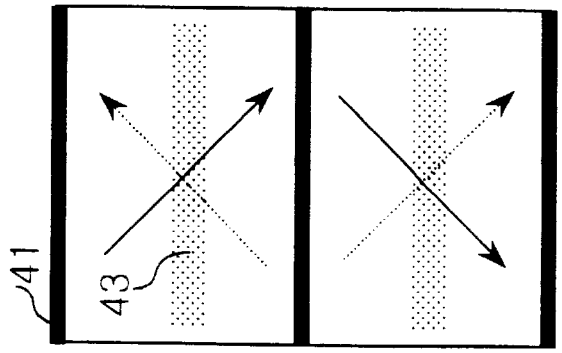
Figure 11C:
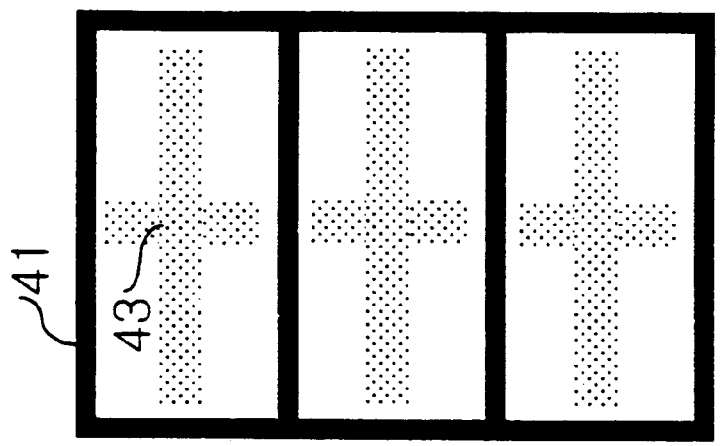
FIGS. 11A, 11B, and 11C are plan views of the multi-domain liquid crystal display devices according to embodiments of the present invention.
Figure 11B:
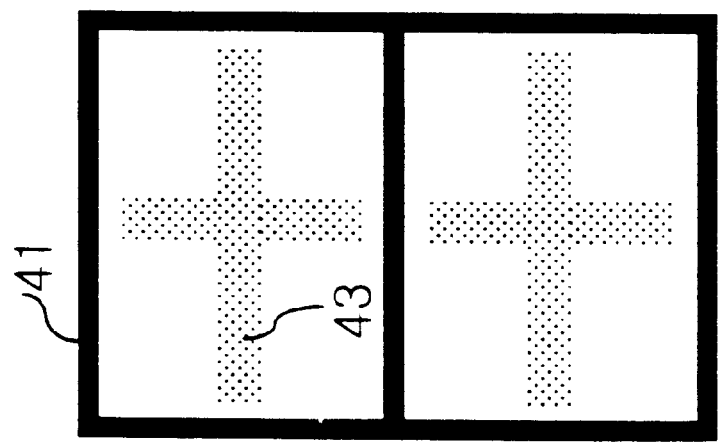
Figure 11A:
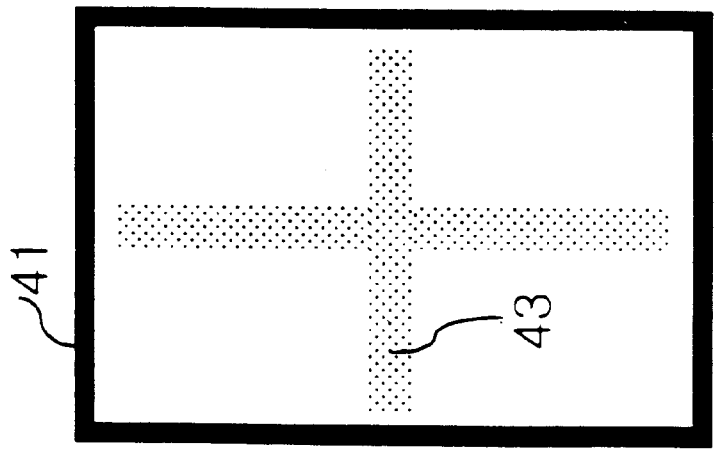
Figure 12D:
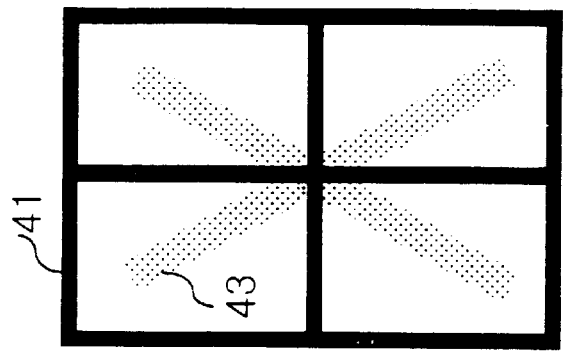
FIGS. 12A, 12B, 12C, and 12D are plan views of the multi-domain liquid crystal display devices according to embodiments of the present invention.
Figure 12C:
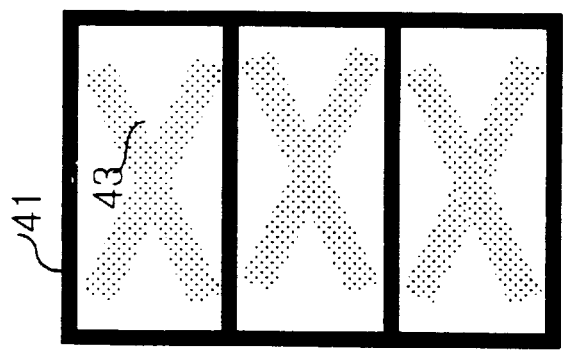
Figure 12B:
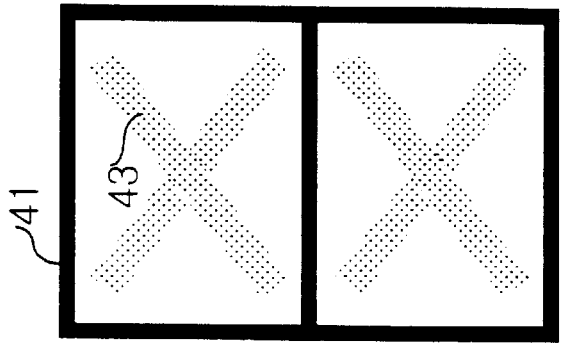
Figure 12A:
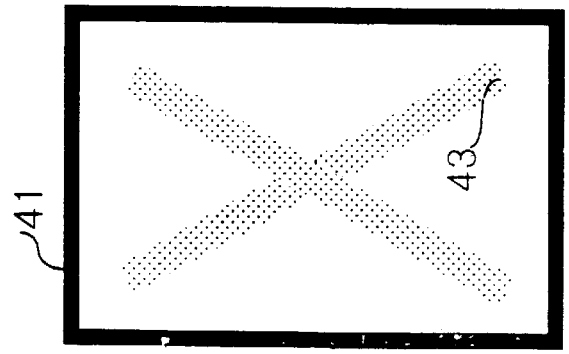
Figure 13C:
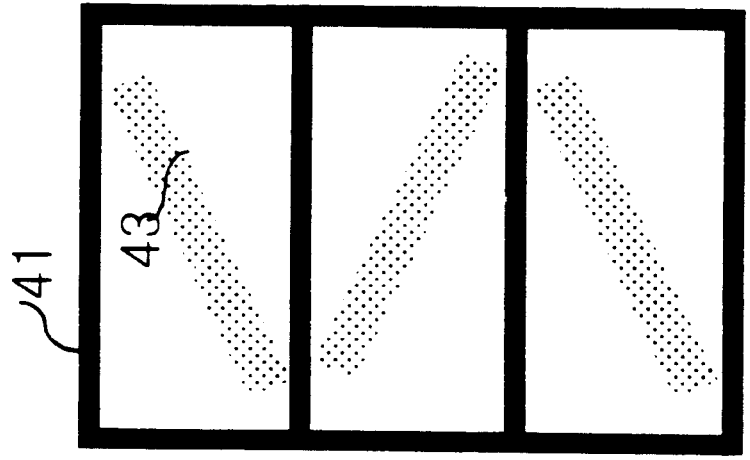
FIGS. 13A, 13B, and 13C are plan views of the multi-domain liquid crystal display devices according to embodiments of the present invention.
Figure 13B:
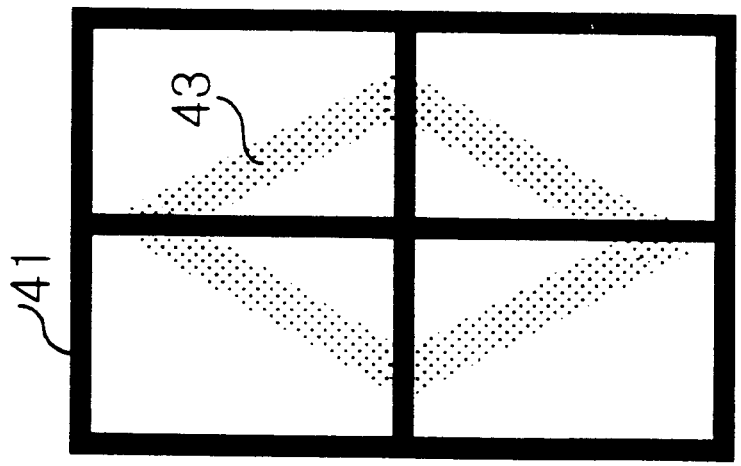
Figure 13A:
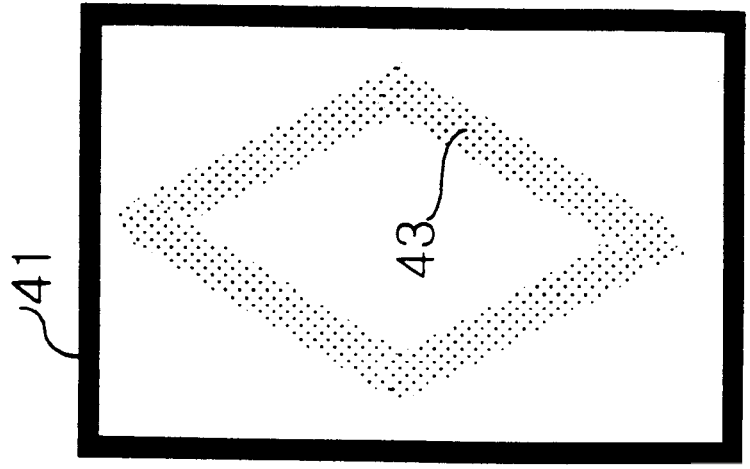
Figure 14B:
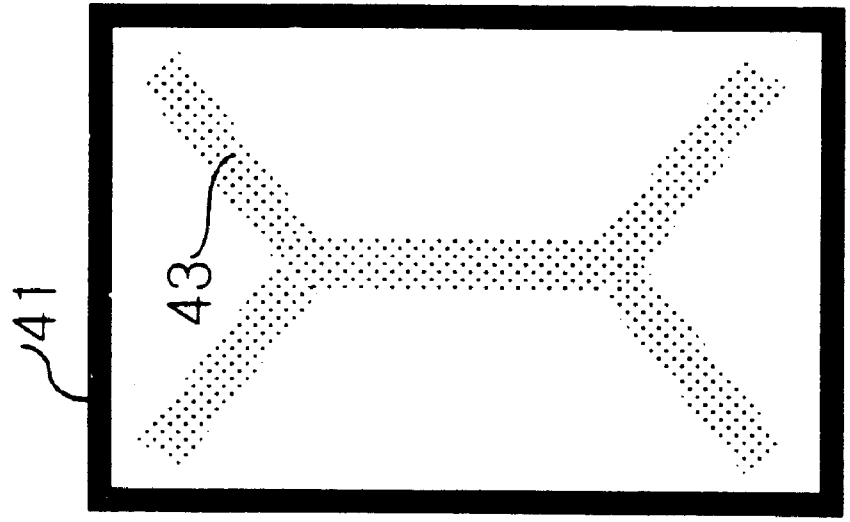
FIGS. 14A and 14B are plan views of the multi-domain liquid crystal display devices according to embodiments of the present invention.
Figure 14A:
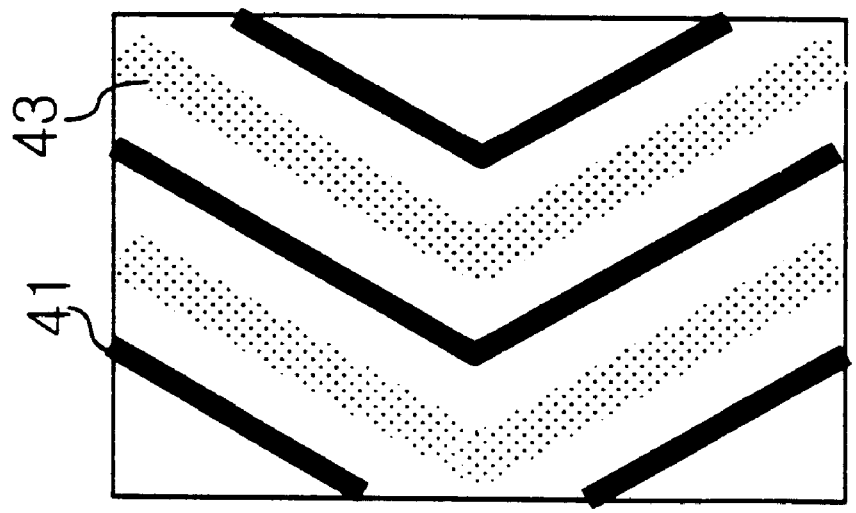

As shown in FIGS. 4, 5, 6, 7, 8, 9, 10, 11, 12, 13, and 14 are plan views showing the various dielectric frames 41 and electric field inducing windows 43 of the multi-domain liquid crystal display devices according to embodiments of the present invention. The solid lined-arrow represents the alignment direction of the second substrate, and the dotted lined arrow represents the alignment direction of the first substrate.

As shown in the FIGS., the dielectric frame 41 and the electric field inducing window 43 are patterned in various shapes, which obtains multi-domain effect. The electric field inducing window 43 may be a slit or hole. Furthermore, neighboring two pixels and two alignment directions are associated, which obtains multi-domain effect.

From forming electric field inducing window 43, the multi-domain is obtained by dividing each pixel into four domains such as in a +, ×, or double Y shape, or dividing each pixel horizontally, vertically, and/or diagonally, and differently alignment-treating or forming alignment directions on each domain and on each substrate.

On at least one substrate, a compensation film 29 is formed with polymer. The compensation film 29 is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film 29, which has two optical axes and has wider viewing-angle characteristics as compared with the negative uniaxial film. The compensation film 29 could be formed on both substrates or on one of them.

After forming the compensation film 29, polarizer is formed on at least one substrate.

At this time, the compensation film 29 and polarizer are preferably composed as one.

In the present LCD, the liquid crystal layer includes liquid crystal molecules having negative dielectric anisotropy, which applies a homeotropic alignment where liquid crystal molecules in the liquid crystal layer are aligned homeotropically to surfaces of the first and second substrates.

In multi-domain LCD of the present invention, an alignment layer(not shown in the FIG.) is formed over the whole first and/or second substrates. The alignment layer includes a material such as polyamide or polyamide based materials, PVA (polyvinylalcohol), polyamic acid or $SiO_2$. When rubbing is used to determine an alignment direction, it should be possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for the photo-aligning treatment may be used.

Irradiating light once on the alignment layer determines the alignment or pretilt direction and the pretilt angle. The light used in the photo-alignment is preferably a light in a range of ultraviolet light, and any of nonpolarized light, linearly polarized light, and partially polarized light can be used.

In the rubbing or photo-alignment treatment, it is possible to apply one or both of the first and second substrates, and to apply different aligning-treatment on each substrate.

From the aligning-treatment, a multi-domain LCD is formed with at least two domains, and LC molecules of the LC layer are aligned differently one another on each domain. That is, the multi-domain is obtained by dividing each pixel into four domains such as in a + or × shape, or dividing each pixel horizontally, vertically, and/or diagonally, and differently alignment-treating or forming alignment directions on each domain and on each substrate.

It is possible to have at least one domain of the divided domains unaligned. It is also possible to have all domains unaligned.

Consequently, the multi-domain LCD of the present invention forms dielectric frames of which dielectric constant is different from that of liquid crystal, and electric field inducing window to distort electric field, thereby wide viewing angle is obtained.

Furthermore, in the case of conducting an alignment-treatment, a high response time and a stable LC structure can be obtained by a pretilt angle and an anchoring energy.

It will be apparent to those skilled in the art that various modifications can be made in the liquid crystal display device of the present invention without departing from the sprit or scope of the invention. Thus, it is intended that the present invention covers the modifications and variations of this invention provided they come within the scope of the appended claims and their equivalents.

What is claimed is:

1. A multi-domain liquid crystal display device comprising:

a first and second substrates facing each other;

a liquid crystal layer between said first and second substrates;

a pixel electrode on said first substrate including an electric field inducing window;

a dielectric frame controlling alignment direction of liquid crystal molecules in said liquid crystal layer;

a light shielding layer on said second substrate;

a color filter layer on said shielding layer;

a common electrode on said color filter layer; and an alignment layer on at least one of the first and second substrates, wherein at least one of said common electrode and pixel electrode has an electric field inducing window in an inner part thereof.

2. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode in said pixel region the pixel electrode having an electric field inducing window;

a dielectric frame controlling alignment direction of liquid crystal molecules in said liquid crystal layer;

a light shielding layer on said second substrate;

a color filter layer on said light shielding layer;

a common electrode on said color filter layer; and an alignment layer on at least one substrate between said first and second substrates.

3. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode in said pixel region;

a dielectric frame controlling alignment direction of liquid crystal molecules in said liquid crystal layer;

a light shielding layer on said second substrate;

a color filter layer on said light shielding layer;

a common electrode on said color filter layer; and an alignment layer on at least one substrate between said first and second substrates, wherein at least one of said common electrode and pixel electrode has an electric field inducing window in an inner part thereof.

4. The multi-domain liquid crystal display device according to claim 3, wherein said dielectric frame is patterned.

5. The multi-domain liquid crystal display device according to claim 3, further comprising;

an overcoat layer on said color filter layer.

6. The multi-domain liquid crystal display device according to claim 3, wherein said dielectric frame surrounds said pixel region.

7. The multi-domain liquid crystal display device according to claim 3, wherein said dielectric frame is formed in said pixel region.

8. The multi-domain liquid crystal display device according to claim 3, wherein said dielectric frame is formed on said pixel electrode.

9. The multi-domain liquid crystal display device according to claim 3, wherein said dielectric frame is formed on said common electrode.

10. The multi-domain liquid crystal display device according to claim 9, wherein said dielectric frame is formed in an area which said light shielding layer is formed in.

11. The multi-domain liquid crystal display device according to claim 3, wherein said pixel electrode includes a material selected from the group consisting of ITO (indium tin oxide), aluminum, and chromium.

12. The multi-domain liquid crystal display device according to claim 3, wherein dielectric constant of said dielectric frame is equal to or lower than dielectric constant of said liquid crystal layer.

13. The multi-domain liquid crystal display device according to claim 3, wherein said dielectric frame includes photosensitive materials.

14. The multi-domain liquid crystal display device according to claim 3, wherein said dielectric frame includes a material selected from the group consisting of photoacrylate and BCB (BenzoCycloButene).

15. The multi-domain liquid crystal display device according to claim 3, wherein said common electrode includes ITO (indium tin oxide).

16. The multi-domain liquid crystal display device according to claim 3, wherein said pixel region is divided into at least two portions, liquid crystal molecules in said liquid crystal layer in each portion being driven differently from each other.

17. The multi-domain liquid crystal display device according to claim 3, wherein said alignment layer is divided into at least two portions, liquid crystal molecules in said liquid crystal layer in each portion being aligned differently from each other.

18. The multi-domain liquid crystal display device according to claim 17, wherein at least one portion of said alignment layer is alignment-treated.

19. The multi-domain liquid crystal display device according to claim 17, wherein all portions of said alignment layer are non-alignment-treated.

20. The multi-domain liquid crystal display device according to claim 17, wherein at least one portion of said alignment layer is rubbing-treated.

21. The multi-domain liquid crystal display device according to claim 20, wherein said alignment layer includes a material selected from the group consisting of polyamide and polyamide based materials, PVA (polyvinylalcohol), polyamic acid, and silicon dioxide.

22. The multi-domain liquid crystal display device according to claim 17, wherein at least one portion of said alignment layer is photo-alignment-treated.

23. The multi-domain liquid crystal display device according to claim 22, wherein said alignment layer includes a material selected from the group consisting of PVCN (polyvinylcinnamate), PSCN (polysiloxanecinnamate), and CelCN (cellulosecinnamate) based materials.

24. The multi-domain liquid crystal display device according to claim 22, wherein said alignment layer is photo-aligned by ultraviolet light.

25. The multi-domain liquid crystal display device according to claim 22, wherein said alignment layer is photo-aligned by irradiating light at least one time.

26. The multi-domain liquid crystal display device according to claim 3, wherein said liquid crystal layer includes liquid crystal molecules having positive dielectric anisotropy.

27. The multi-domain liquid crystal display device according to claim 3, wherein said liquid crystal layer includes liquid crystal molecules having negative dielectric anisotropy.

28. The multi-domain liquid crystal display device according to claim 3, wherein said liquid crystal layer includes chiral dopants.

29. The multi-domain liquid crystal display device according to claim 3, further comprising:

a negative uniaxial film on at least one substrate between said first and second substrates.

30. The multi-domain liquid crystal display device according to claim 3, further comprising:

a negative biaxial film on at least one substrate between said first and second substrates.

* * * * *